(12) United States Patent
Lee et al.

(10) Patent No.: US 10,222,214 B2
(45) Date of Patent: Mar. 5, 2019

(54) DIGITAL SIGHT FOR HAND-CARRIED PROJECTILE-FIRING DEVICE AND METHOD OF CONTROLLING THE SAME

(71) Applicant: Agency for Defense Development, Daejeon (KR)

(72) Inventors: Tae-Gyoo Lee, Seoul (KR); Suk-Won Jang, Daejeon (KR); Jin-Seung Lee, Daejeon (KR); Jae-Gun Choi, Seoul (KR); Hong-Key Moon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 43 days.

(21) Appl. No.: 15/506,219

(22) PCT Filed: Nov. 13, 2014

(86) PCT No.: PCT/KR2014/010913
§ 371 (c)(1),
(2) Date: Feb. 23, 2017

(87) PCT Pub. No.: WO2016/072547
PCT Pub. Date: May 12, 2016

(65) Prior Publication Data
US 2018/0216938 A1    Aug. 2, 2018

(30) Foreign Application Priority Data

Nov. 5, 2014   (KR) ................... 10-2014-0152674

(51) Int. Cl.
*G01C 21/16*   (2006.01)
*F41G 11/00*   (2006.01)
(Continued)

(52) U.S. Cl.
CPC .............. *G01C 21/165* (2013.01); *F41F 1/06* (2013.01); *F41G 1/46* (2013.01); *F41G 1/50* (2013.01);
(Continued)

(58) Field of Classification Search
CPC . G01C 21/165; F41F 1/06; F41G 3/02; F41G 1/393; F41G 1/50; F41G 11/00; G05D 1/08; G01P 15/14
See application file for complete search history.

(56) References Cited

U.S. PATENT DOCUMENTS

2005/0125141 A1   6/2005   Bye et al.
2009/0070058 A1*  3/2009   Lin .......................... F41G 1/50
                                                                    702/93
(Continued)

FOREIGN PATENT DOCUMENTS

EP   1 847 795 A2   10/2007
EP   2 306 149 A1   4/2011
(Continued)

OTHER PUBLICATIONS

Jin Seung Lee, North-Finding System Using Multi-Position Method With a Two-Axis Rotary Table for a Mortar, IEEE Sensors Journal, vol. 16, No. 16, Aug. 15, 2016.*
(Continued)

*Primary Examiner* — Benjamin P Lee
(74) *Attorney, Agent, or Firm* — John P. White; Cooper & Dunham LLP (57) ABSTRACT

The present invention relates to a digital sight for a hand-carried projectile-firing device and a method of controlling the digital sight. A digital sight for a hand-carried projectile-firing device according to an embodiment of the present invention is a digital sight for a hand-carried projectile-firing device, the digital sight including an inertial sensor package
(Continued)

and a manual rotation device, wherein the inertial sensor package includes a gyroscope and an accelerometer module. In accordance with the present invention, equipment for measuring the firing direction of a hand-carried projectile-firing device such as a mortar is replaced with a digital sight for a hand-carried projectile-firing device, which reduces an estimation error while using a single medium-low level gyroscope, thus enabling the projectile-firing device to precisely and promptly fire a projectile and improving the operability thereof.

16 Claims, 8 Drawing Sheets

(51) Int. Cl.
| | |
|---|---|
| *F41G 1/46* | (2006.01) |
| *F41G 1/50* | (2006.01) |
| *F41F 1/06* | (2006.01) |
| *F41G 3/02* | (2006.01) |
| *F41G 7/36* | (2006.01) |
| *G01P 15/14* | (2013.01) |
| *G01C 17/00* | (2006.01) |
| *G01C 19/38* | (2006.01) |
| *F41G 3/16* | (2006.01) |

(52) U.S. Cl.
CPC ............... *F41G 3/02* (2013.01); *F41G 3/16* (2013.01); *F41G 7/36* (2013.01); *F41G 11/00* (2013.01); *F41G 11/004* (2013.01); *G01C 17/00* (2013.01); *G01C 19/38* (2013.01); *G01P 15/14* (2013.01)

(56) References Cited

U.S. PATENT DOCUMENTS

| | | |
|---|---|---|
| 2009/0326851 A1 | 12/2009 | Tanenhaus |
| 2010/0269681 A1 | 10/2010 | Shipman et al. |
| 2011/0066395 A1 | 3/2011 | Judd |
| 2012/0059575 A1 | 3/2012 | Hartman et al. |
| 2012/0118955 A1 | 5/2012 | Cox et al. |
| 2014/0118723 A1 | 5/2014 | Winker et al. |

FOREIGN PATENT DOCUMENTS

| | | | |
|---|---|---|---|
| EP | 2 354 752 A1 | 8/2011 | |
| EP | 2354752 A1 * | 8/2011 | ............... F41G 3/02 |
| KR | 1988-0003168 A | 5/1988 | |
| KR | 2013-0061331 A | 6/2013 | |
| KR | 10-1359563 B1 | 2/2014 | |
| KR | 10-1386643 B1 | 4/2014 | |
| KR | 10-1389174 B1 | 4/2014 | |
| WO | WO-9401739 A1 * | 1/1994 | ............... F41G 3/04 |

OTHER PUBLICATIONS

International Search Report in connection with PCT International Application No. PCT/KR2014/010913.
Extended European search report dated Aug. 25, 2017 in corresponding European patent application 14905474.4.

\* cited by examiner

DIGITAL SIGHT FOR HAND-CARRIED PROJECTILE-FIRING DEVICE AND METHOD OF CONTROLLING THE SAME

CROSS-REFERENCE TO RELATED APPLICATIONS

This application is a § 371 national stage of PCT International Application No. PCT/KR2014/010913, filed Nov. 13, 2014, claiming priority of Korean Patent Application No. KR 10-2014-0152674, filed Nov. 5, 2014, the content of each of which is hereby incorporated by reference into the application.

TECHNICAL FIELD

The present invention generally relates to a digital sight for a hand-carried projectile-firing device and a method of controlling the digital sight and, more particularly, to a digital sight for a hand-carried projectile-firing device and a method of controlling the digital sight, which reduce a burden of cost while improving precision.

BACKGROUND ART

A projectile weapon system includes equipment capable of measuring a desired firing direction. A firing direction is determined according to the angle (azimuth angle) of a target with respect to the north. In a hand-carried weapon system such as a mortar, a compass is used to measure an azimuth angle and is advantageous in that the azimuth angle may be estimated at relatively low cost, but the precision thereof is not high and the compass is influenced by the surrounding environment, and thus the precision is further deteriorated. In order to solve such a precision problem, an inertial navigation device may be used, but it is expensive and is unsuitable for hand-carried weapon systems due to a large weight and volume.

Further, it is possible to obtain an azimuth angle using an inertial navigation system such as a Global Positioning System (GPS), but an operation procedure for the system is very complicated, and difficulty in use is present in such a way that an additional satellite navigation receiver must be mounted at as long range as possible so as to obtain precision. Furthermore, this method is influenced by the surrounding environment such as geographic features or buildings, and is also influenced by intentional/unintentional electromagnetic environments.

Accordingly, various types of research into azimuth angle measurement techniques that meet small size/light weight/low cost required by hand-carried weapon systems such as mortars have been conducted in the past. Generally, an inertial navigation device is composed of three gyroscopes, wherein azimuth angle measurement equipment is configured using one or two gyroscopes so as to implement small-sized, lightweight, and inexpensive azimuth angle measurement equipment. However, a gyroscope required to obtain desired precision is generally expensive. Consequently, the azimuth angle measurement equipment is still expensive even if the price thereof is lower than that of the inertial navigation device. Therefore, research into a multi-position azimuth angle estimation technique and a rotation-type azimuth angle estimation technique using inexpensive medium-low level gyroscopes has been conducted.

Such a multi-position estimation technique is a method for eliminating a gyroscope bias that becomes the fundamental cause of error in an azimuth angle while changing the position of a gyroscope measurement axis, and thereafter estimating the azimuth angle. For such a technique, a 2-position estimation technique using two gyroscopes is well known. However, when 2-position estimation is performed using a single gyroscope, there are problems in that an inverse trigonometric function is a many-valued function and in that an error in the estimation of an azimuth angle is dependent on an actual azimuth angle, thus making it impossible to actually obtain an azimuth angle. Therefore, three or more positions are required, and an increase in the number of positions increases an estimation error due to a gyro random walk that is another error factor of a gyroscope. A rotation-type estimation technique is a method of rotating a gyroscope at constant velocity and eliminating a gyroscope bias using the output of the gyroscope and the rotational position/velocity information of the gyroscope. However, it is difficult to precisely configure rotation equipment, there is an environmental limitation, and cost is also increased.

DISCLOSURE

Technical Problem

The present invention has been made keeping in mind the above problems, and an object of the present invention is to provide a digital sight for a hand-carried projectile-firing device and a method of controlling the digital sight, which decrease an estimation error while using a single inexpensive medium-low level gyroscope.

Technical Solution

A digital sight for a hand-carried projectile-firing device according to an embodiment of the present invention is a digital sight (100) for a hand-carried projectile-firing device, the digital sight including an inertial sensor package (200) and a manual rotation device (300), wherein the inertial sensor package (200) includes a gyroscope (210) and an accelerometer module (220).

The accelerometer module (220) may include a horizontal accelerometer arranged horizontally to the gyroscope (210), and a vertical accelerometer arranged vertically to the gyroscope (210), and a geomagnetic sensor.

The inertial sensor package (200) may include one or more of a gyroscope signal processing board (230), an accelerometer module signal processing board (240), a wired/wireless communication board (250), and an antenna (260).

The manual rotation device (300) may include an azimuth angle adjustment device (310), an altitude adjustment device (320), a digital sight bracket (330), and a mounting bracket (340).

A method of controlling a digital sight for a hand-carried projectile-firing device according to another embodiment of the present invention includes a preparation step (S100) of, by using a vertical accelerometer and a horizontal accelerometer, performing horizontal alignment and then aligning a gyroscope measurement axis with a firing direction; a step (S200) of, after the preparation step (S100), acquiring a first approximate azimuth angle from auxiliary information; a step (S300) of, after the step (S200) of acquiring the first approximate azimuth angle, calculating a second approximate azimuth angle; and a step (S400) of, after the step (S300) of calculating the second approximate azimuth angle, calculating a first precise azimuth angle.

The step (S300) of calculating the second approximate azimuth angle may include a step (S310) of determining availability of the first approximate azimuth angle acquired at the step (S200) of acquiring the first approximate azimuth angle; a step (S320) of, if it is determined at step (S310) that the first approximate azimuth angle is available, rotating the gyroscope measurement axis so that the gyroscope measurement axis is coincident with a due east direction with respect to the first approximate azimuth angle; a step (S330) of, after the first rotation step (S320), acquiring a first average ($\Omega_1$) of gyroscope measurement values of the digital sight for the hand-carried projectile-firing device for a preset first time period ($T_1$); a second rotation step (S340) of, after the first average acquisition step (S330), rotating the gyroscope measurement axis at an angle of 180°; a step (S350) of, after the second rotation step (S340), of acquiring a second average ($\Omega_2$) of gyroscope measurement values of the digital sight for the hand-carried projectile-firing device for the preset first time period ($T_1$); a step (S360) of calculating an approximate bias from the first average ($\Omega_1$) and the second average ($\Omega_2$); a step (S370) of, after the approximate bias calculation step (S360), determining whether latitude information at a current position is retained; and a step (S380) of, if it is determined at step (S370) that the latitude information at the current position is retained, calculating the second approximate azimuth angle from the first average ($\Omega_1$) and the second average ($\Omega_2$).

The step (S400) of calculating the first precise azimuth angle may include a step (S410) of determining availability of the second approximate azimuth angle; a step (S420) of, if it is determined that the second approximate azimuth angle is available, acquiring a third average ($\Omega_3$) of gyroscope measurement values of the digital sight for the hand-carried projectile-firing device for a preset second time period ($T_2$); a third rotation step (S430) of, after the third average acquisition step (S420), rotating the gyroscope measurement axis at an angle of 180°, a step (S440) of, after the third rotation step (S430), acquiring a fourth average ($\Omega_4$) of gyroscope measurement values of the digital sight for the hand-carried projectile-firing device for the preset second time period ($T_2$); a step (S450) of calculating a first precise bias from the third average ($\Omega_3$) and the fourth average ($\Omega_4$); and a step (S460) of calculating a first precise azimuth angle from the third average ($\Omega_3$) and the fourth average ($\Omega_4$).

The method may further include, if it is determined at step (S410) that the second approximate azimuth angle is not available, a step (S470) of determining whether the second approximate azimuth angle falls within a range from 45° to 135° when the gyroscope measurement axis is rotated at an angle of 90° or −90°; and a fourth rotation step (S480) of rotating the gyroscope measurement axis at an angle of 90° or −90° if it is determined at step S470 that the second approximate azimuth angle falls within the range from 45° to 135° when the gyroscope measurement axis is rotated at an angle of 90° or −90°, wherein, after the fourth rotation step (S480), the third average acquisition step (S420) is performed.

The method may further include a step (S500) of calculating a second precise azimuth angle if it is determined at step (S470) that the second approximate azimuth angle does not fall within the range from 45° to 135° when the gyroscope measurement axis is rotated at an angle of 90° or −90°.

The step (S500) of calculating the second precise azimuth angle may include a step (S510) of acquiring a fifth average ($\Omega_2'$) of gyroscope measurement values of the digital sight for the hand-carried projectile-firing device for the preset second time period ($T_2$); a fifth rotation step (S520) of, after the fifth average acquisition step (S510), rotating the gyroscope measurement axis at an angle of 90°; a step (S530) of, after the fifth rotation step (S520), acquiring a sixth average ($\Omega_3'$) of gyroscope measurement values of the digital sight for the hand-carried projectile-firing device for the preset second time period ($T_2$); a step (S540) of calculating a second precise bias from the fifth average ($\Omega_2'$) and the sixth average ($\Omega_3'$); and a step (S550) of calculating a second precise azimuth angle from the fifth average ($\Omega_2'$) and the sixth average ($\Omega_3'$).

The step (S500) of calculating the second precise azimuth angle may be perfoiined even if it is determined at step (S370) that the latitude information at the current location is not retained.

One or more of the second approximate azimuth angle, the first precise azimuth angle, and the second precise azimuth angle may be used as the auxiliary information at the step (S200) of acquiring the first approximate azimuth angle.

Advantageous Effects

As described above, in accordance with the present invention, equipment for measuring the firing direction of a hand-carried projectile-firing device such as a mortar is replaced with a digital sight for a hand-carried projectile-firing device, which reduces an estimation error while using a single medium-low level gyroscope, thus enabling the projectile-firing device to precisely and promptly fire a projectile and improving the operability thereof. Further, the present invention can improve the durability of the digital sight against the environment because of the minimization of use of electronic equipment caused by the use of a manual rotation device, and can protect core parts from an extreme environment, such as a high impact caused by the firing of projectiles, by promptly mounting/removing the digital sight for the hand-carried projectile-firing device.

BEST MODE

It should be noted that the terms and words used in the specification and the accompanying claims should not be construed as being limited to ordinary meanings or dictionary definitions. The present invention should be understood to have meanings and concepts coping with the technical spirit of the present invention based on the principle that an inventor can appropriately define the concepts of terms in order to best describe his or her invention. Therefore, the embodiments described in the specification and the configurations illustrated in the drawings are merely preferred examples and do not exhaustively present the technical spirit of the present invention. Accordingly, it should be appreciated that there may be various equivalents and modifications that can replace the embodiments and the configurations at the time at which the present application is filed. Further, detailed descriptions of known functions and configurations which have been deemed to make the gist of the present invention unnecessarily obscure will be omitted below. Hereinafter, preferred embodiments of the present invention will be described in detail with reference to the attached drawings.

Figure 1:
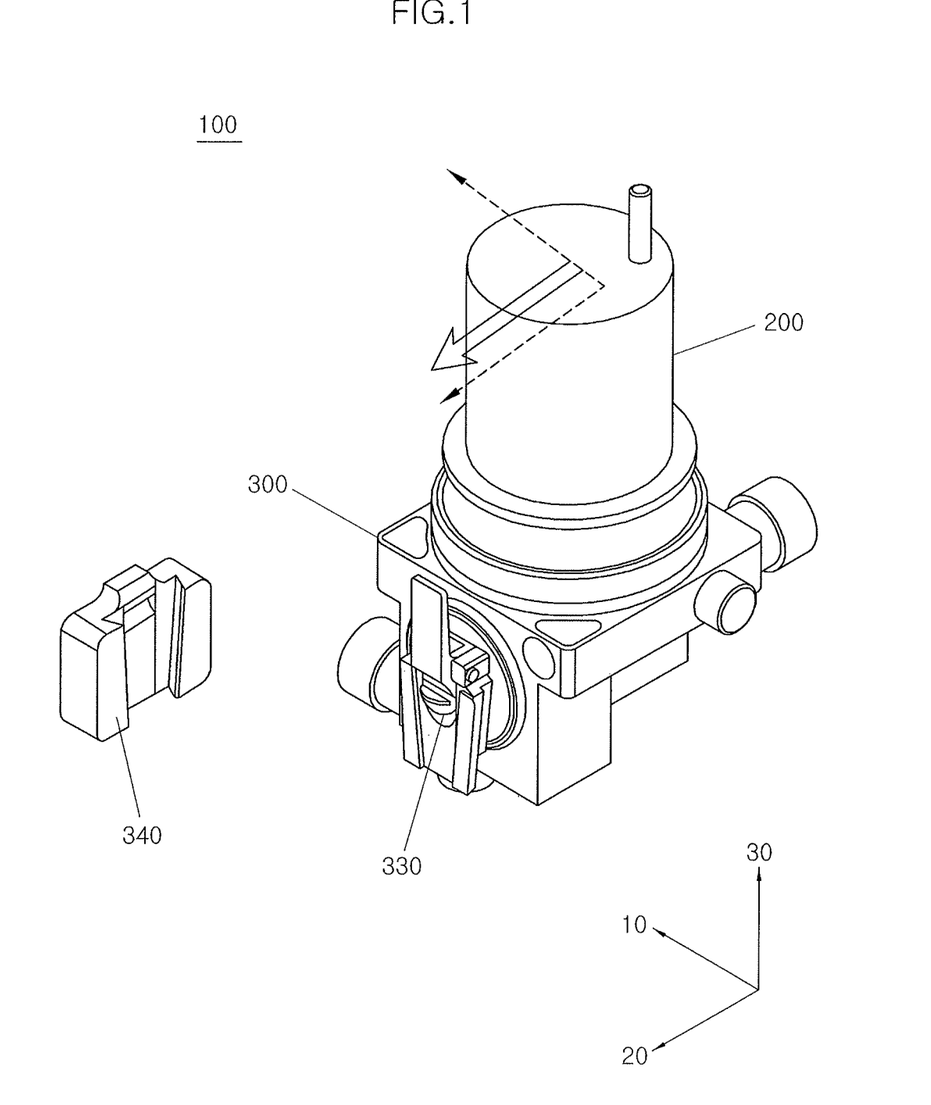
FIG. 1 is a diagram showing the configuration of a digital sight for a hand-carried projectile-firing device according to an embodiment of the present invention.
Figure 2:
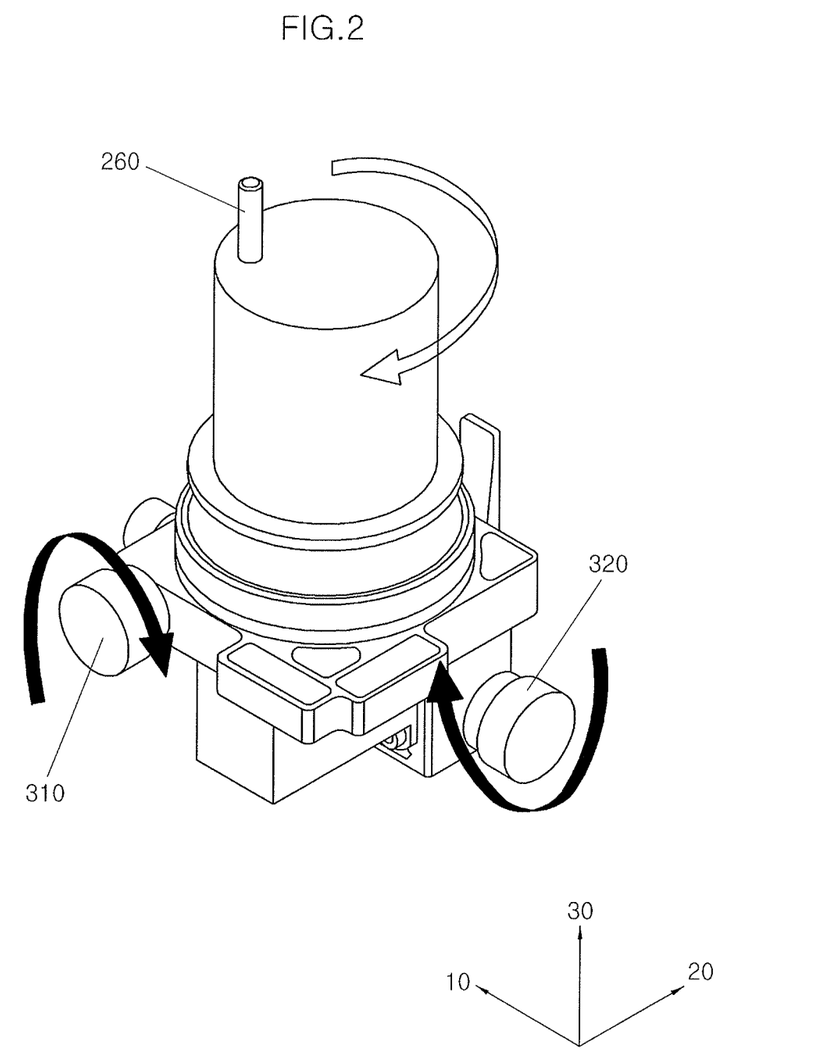
FIG. 2 is a diagram showing the operation of the digital sight for a hand-carried projectile-firing device according to an embodiment of the present invention.
Figure 3:
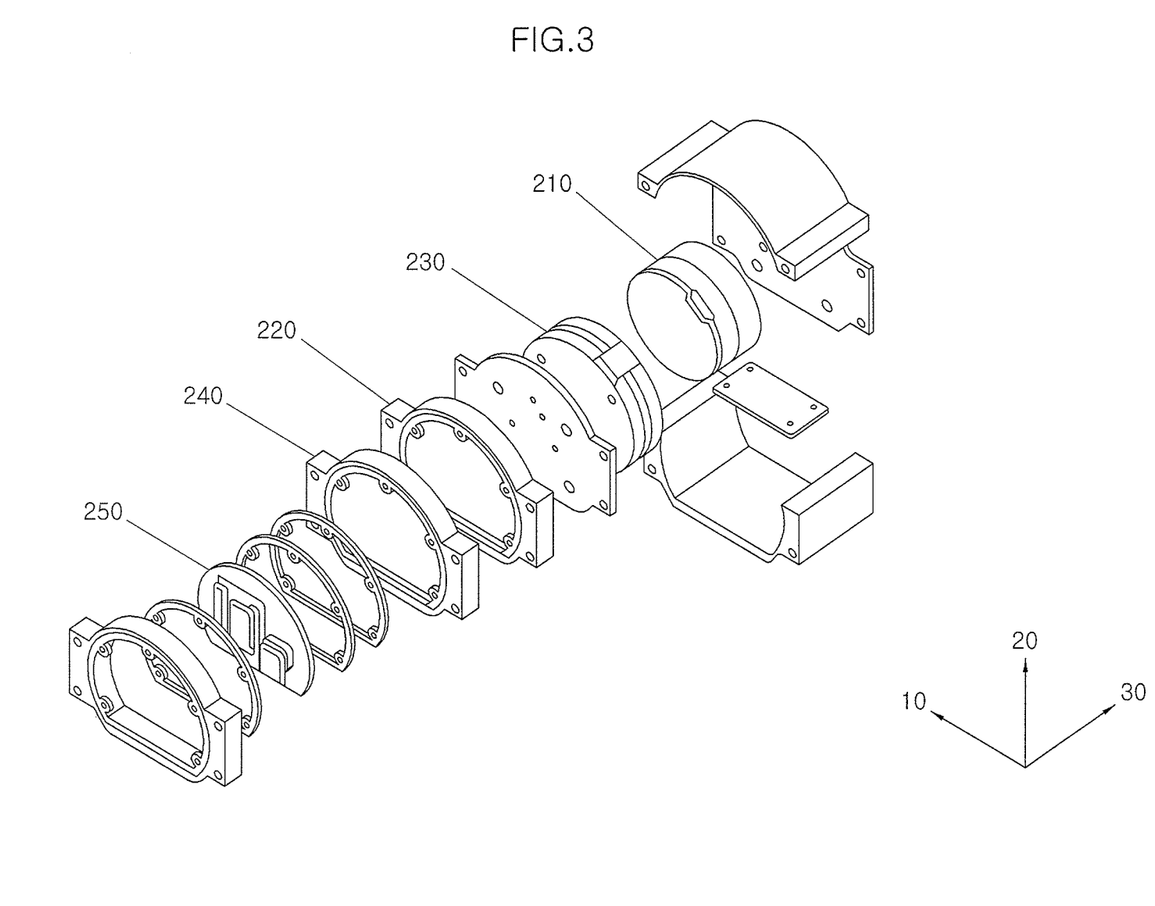
FIG. 3 is a diagram showing the inertial sensor package of the digital sight for a hand-carried projectile-firing device according to an embodiment of the present invention.

FIG. 1 is a diagram showing the configuration of a digital sight for a hand-carried projectile-firing device according to an embodiment of the present invention, FIG. 2 is a diagram showing the operation of the digital sight for a hand-carried projectile-firing device according to an embodiment of the present invention, and FIG. 3 is a diagram showing the inertial sensor package of the digital sight for a hand-carried projectile-firing device according to an embodiment of the present invention. Referring to FIGS. 1 to 3, a digital sight 100 for a hand-carried projectile-firing device according to an embodiment of the present invention includes an inertial sensor package 200 and a manual rotation device 300. The inertial sensor package 200 includes a single gyroscope 210; and an accelerometer module 220 having two accelerometers and a geomagnetic sensor, and further includes a gyroscope signal processing board 230, an accelerometer module signal processing board 240, a wired/wireless communication board 250, and an antenna 260. The geomagnetic sensor may be used as an auxiliary sensor. The manual rotation device 300 include an azimuth angle adjustment device 310, an altitude adjustment device 320, and a digital sight bracket 330 and a mounting bracket 340 respectively installed on the digital sight and the projectile-firing device so that the digital sight according to the present invention may be easily mounted/removed on/from the projectile-firing device.

The arrangement of sensors according to the present invention is performed such that the single gyroscope 210 and the two accelerometers are arranged on the same plane. Here, one accelerometer is horizontally arranged and the other accelerometer is arranged vertically to the accelerometer. In the present invention, by using the single medium-low level gyroscope 210 and the manual rotation device 300, an inexpensive small-sized gyrocompass has been implemented, and a multi-position technique has been devised to improve the performance of azimuth angle estimation. Further, environmental performance may be improved by minimizing the use of electronic equipment due to the use of the manual rotation device 300, and core parts may be protected from an extreme environment by promptly mounting/removing the inertial sensor package 200 on/from the manual rotation device 300.

Figure 4:
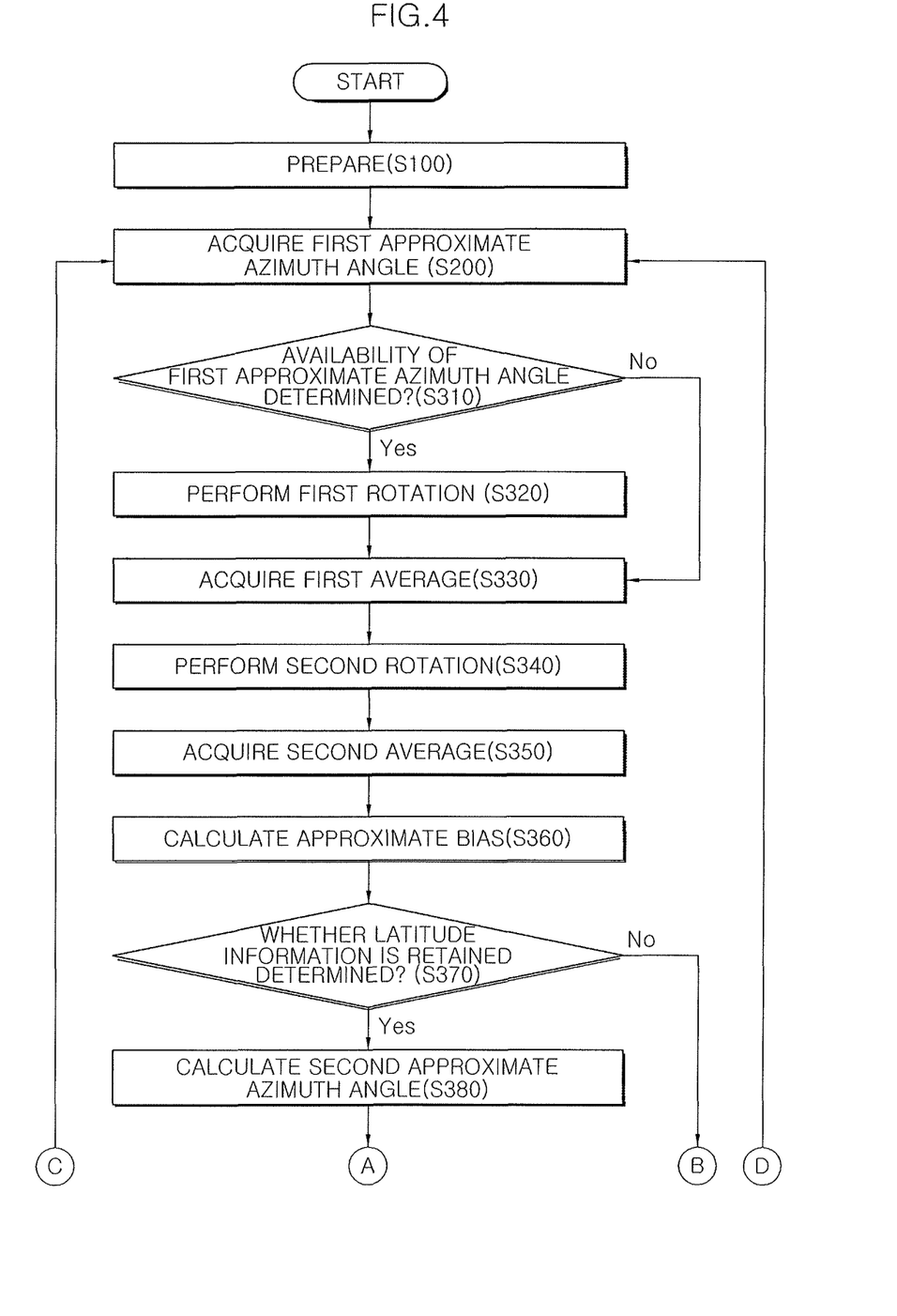
FIGS. 4, 5 and 6 are flowcharts showing a method of controlling a digital sight for a hand-carried projectile-firing device according to another embodiment of the present invention.
Figure 5:
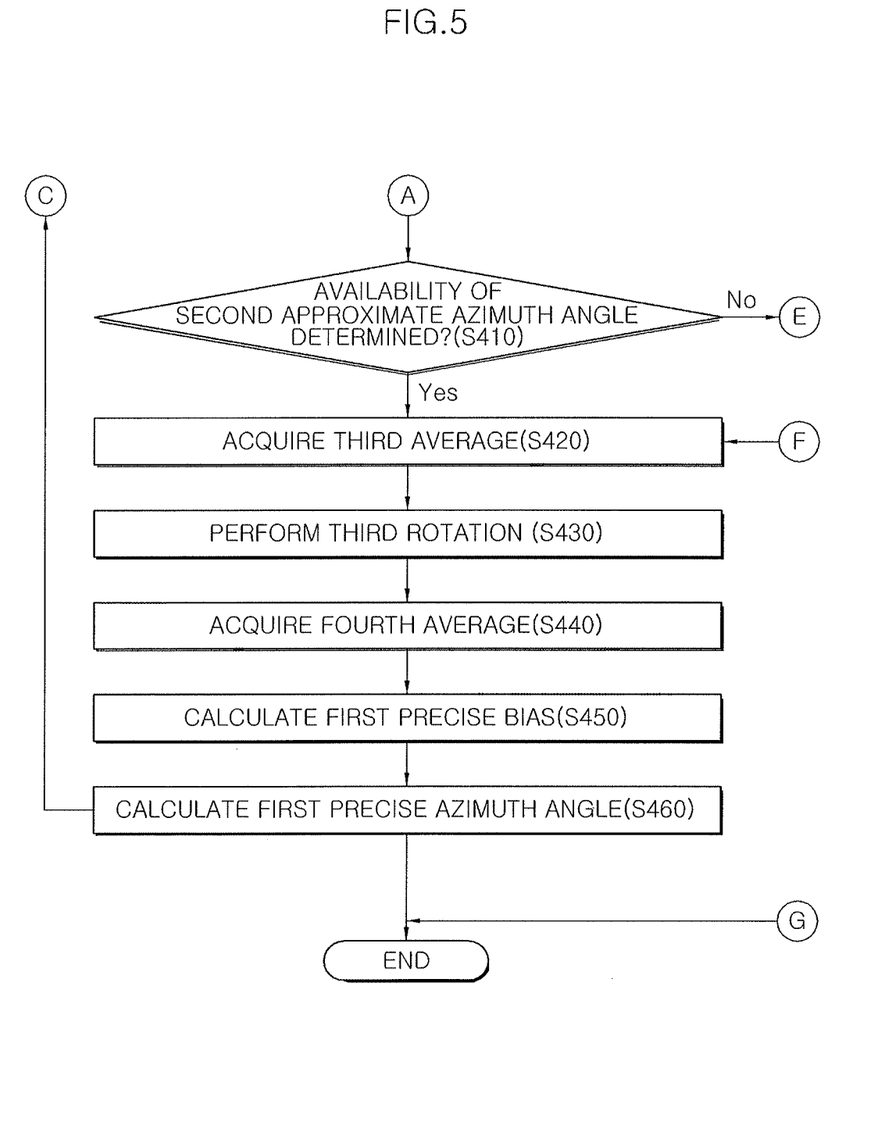
Figure 6:
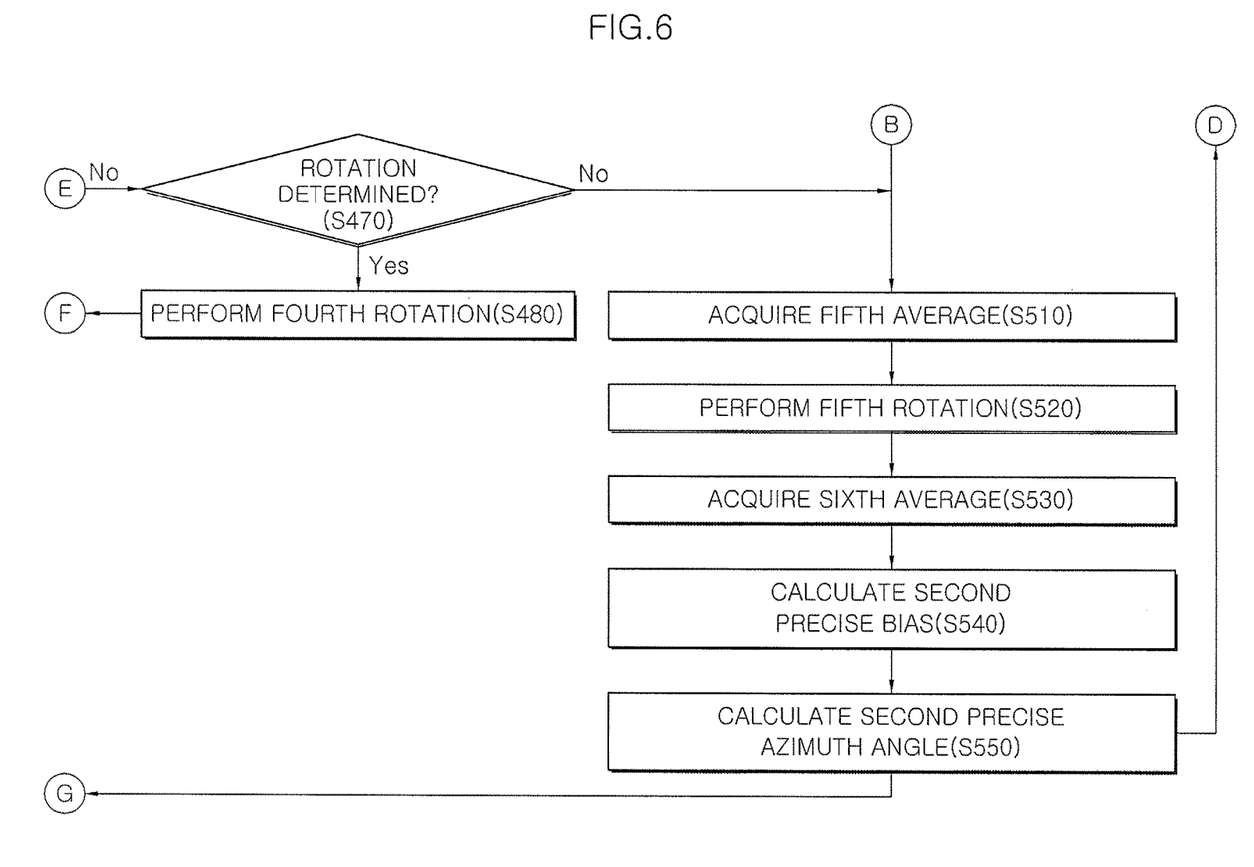
Figure 7:
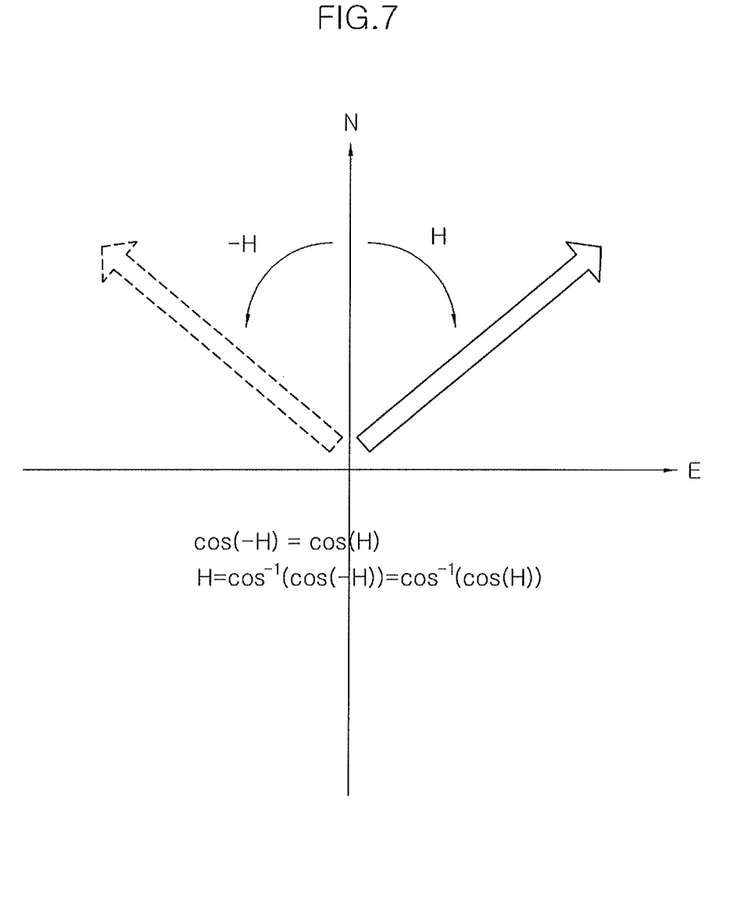
FIG. 7 is a conceptual diagram showing the problem of a many-valued function occurring when an azimuth angle is estimated using only a single gyroscope.
Figure 8:
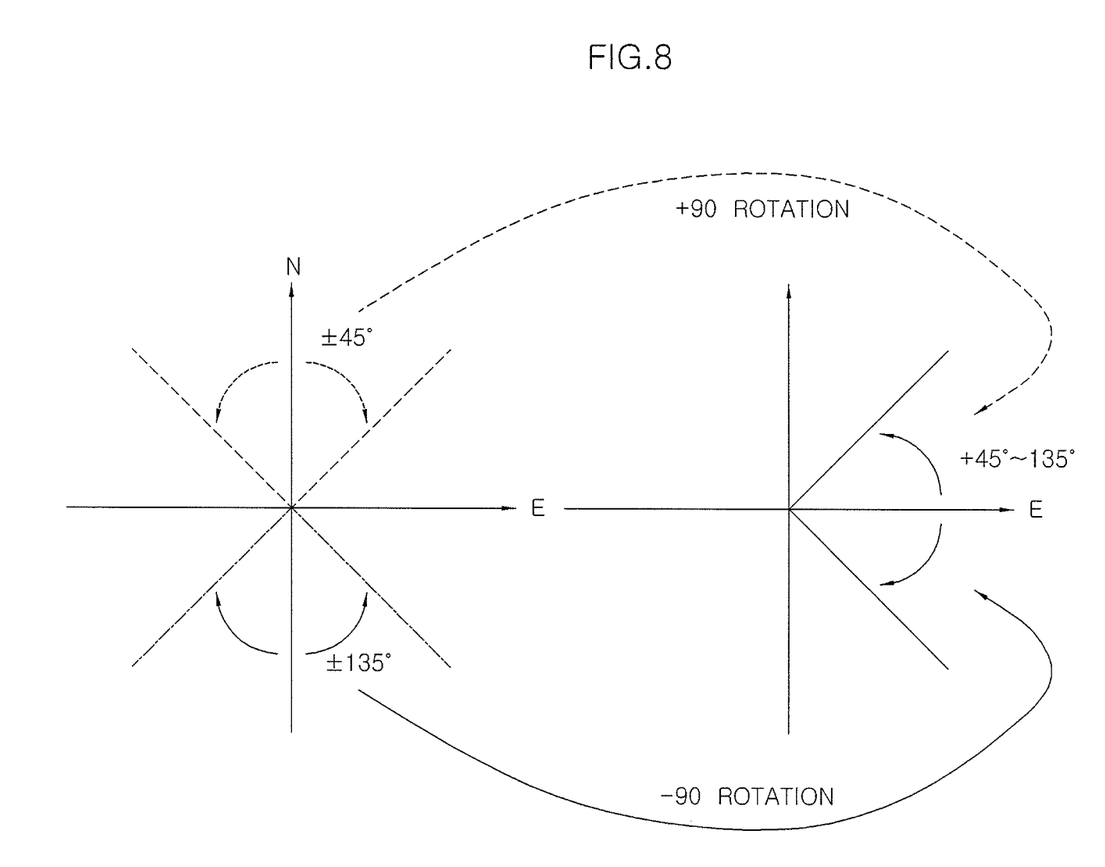
FIG. 8 is a conceptual diagram showing a multi-position rotation method for solving the problem of a many-valued function and improving performance.

FIGS. 4, 5 and 6 are flowcharts showing a method of controlling a digital sight for a hand-carried projectile-firing device according to another embodiment of the present invention, FIG. 7 is a conceptual diagram showing the problem of a many-valued function occurring when an azimuth angle is estimated using only a single gyroscope, and FIG. 8 is a conceptual diagram showing a multi-position rotation method for solving the problem of a many-valued function and improving performance. Referring to FIGS. 4 to 8, the method of controlling the digital sight for a hand-carried projectile-firing device according to another embodiment of the present invention includes a preparation step S100; the step S200 of, after the preparation step S100, acquiring a first approximate azimuth angle from auxiliary information; the step S300 of, after the first approximate azimuth angle acquisition step S200, calculating a second approximate azimuth angle; and the step S400 of, after the second approximate azimuth angle calculation step S300, calculating a first precise azimuth angle.

The preparation step S100 is the step of, by using a vertical accelerometer and a horizontal accelerometer, performing horizontal alignment and then aligning a gyroscope measurement axis with a firing direction, wherein at the preparation step, the firing direction and the gyroscope measurement axis of the digital sight are coincident with each other. The purpose of the digital sight is to obtain the firing direction intended by a gun barrel. Next, since the gyroscope measurement axis is rotated for the multi-position gyrocompass, the azimuth angle of the gun barrel may be detected if the rotation of the gyroscope measurement axis is processed. The preparation step S100 may include installing the mounting bracket 340 on the projectile-firing device, and installing the digital sight on the projectile-firing device using the digital sight bracket 330.

The step S200 of acquiring the first approximate azimuth angle is to acquire the first approximate azimuth angle from the auxiliary information after the preparation step S100. The auxiliary information includes a compass, the sun, stars, geographic features, etc., and the first approximate azimuth angle may be acquired using the above-described auxiliary information. Further, a weapon system may obtain approximate azimuth angle information from a fire direction center or a forward solider. Since the digital sight basically includes the geomagnetic sensor 223 as an auxiliary sensor, it may acquire auxiliary information from the geomagnetic sensor 223. Furthermore, one or more of a second approximate azimuth angle, a first precise azimuth angle, and a second precise azimuth angle may be used as the auxiliary information.

The step S300 of calculating the second approximate azimuth angle includes the step S310 of determining the availability of the first approximate azimuth angle, a first rotation step S320, the step S330 of acquiring a first average, a second rotation step S340, the step S350 of acquiring a second average, the step S360 of calculating an approximate bias, the step S370 of determining whether latitude information, and the step S380 of calculating a second approximate azimuth angle.

The step S310 of determining the availability of the first approximate azimuth angle is the step of determining the availability of the first approximate azimuth angle acquired at the first approximate azimuth angle acquisition step S200. As described above, when a difference between the first approximate azimuth angle acquired from initial auxiliary information (auxiliary information obtained using a compass, the sun, stars, geographic features, etc.) and a first approximate azimuth angle acquired from auxiliary information corresponding to one or more of the second approximate azimuth angle, the first precise azimuth angle, and the second precise azimuth angle falls within a preset error range, the first approximate azimuth angle is determined to be available. The preset error range may be differently set depending on the operating conditions or the like of the digital sight for the hand-carried projectile-firing device according to the present invention.

The first rotation step S320 is the step of rotating the gyroscope measurement axis so that the direction thereof is aligned with a due east direction with respect to the first approximate azimuth angle if it is determined at step S310 that the first approximate azimuth angle is available. For example, when a current first approximate azimuth angle is 30°, the gyroscope measurement axis is additionally rotated by 60° and is then approximately aligned with the east.

The step S330 of acquiring the first average is the step of, after the first rotation step S320, acquiring a first average $\Omega_1$ of gyroscope measurement values of the digital sight for the hand-carried projectile-firing device for a preset first time period $T_1$. That is, when a rotation angle at the first rotation step S320 is defined as β, and the first average of gyroscope measurement values acquired for the first time period $T_1$ at the position after rotation is defined as $\Omega_1$, the following Equation 1 is given:

$$\Omega_1 = \Omega_N \cos(H) + B + \frac{\sigma(RW)}{\sqrt{T}} \quad \text{[Equation 1]}$$

where $\Omega_N = \Omega \cos(\phi)$ denotes the rotational angular velocity of the earth with respect to a north direction, and $\Omega = 15.041$ [deg/hr]. Further, φ denotes latitude at a current position, and H denotes an angle which the north and the gyroscope measurement axis form in a clockwise direction, that is, an azimuth angle. Furthermore, B and σ(RW) respectively denote the bias of the gyroscope and the standard deviation of random walk. It can be seen that the magnitude of the random walk is determined according to the square root of the measurement time $\sqrt{T_1}$, as shown in Equation 1.

The second rotation step S340 is the step of, after the first average acquisition step S330, rotating the gyroscope measurement axis at a preset angle (α(=180°)). The step S350 of acquiring the second average is the step of, after the second rotation step S340, acquiring a second average $\Omega_2$ of the gyroscope measurement values of the digital sight for the hand-carried projectile-firing device for the preset first time period $T_1$. When the azimuth angle is obtained using Equation 1, the errors of the gyroscope, that is, B and σ(RW), must not influence the precision of the azimuth angle required to be obtained, and the problem of a cosine function being a many-valued function must be solved. As a method therefor, if the gyroscope measurement axis is rotated at an angle of α(=180°), and a second average of the gyroscope measurement values measured for the time period $T_1$ is defined as $\Omega_2$, the following Equation 2 is given:

$$\Omega_2 = \Omega_N \cos(H + \alpha) + B + \frac{\sigma(RW)}{\sqrt{T}} \quad \text{[Equation 2]}$$

The step S360 of calculating the approximate bias is the step of calculating an approximate bias from the first average $\Omega_1$ and the second average $\Omega_2$. The step S370 of determining whether latitude information is retained is the step of, after the approximate bias calculation step S360, determining whether latitude information at the current position is retained. The step S380 of calculating the second approximate azimuth angle is the step of calculating the approximate azimuth angle from the first average $\Omega_1$ and the second average $\Omega_2$ if it is determined at step S370 that the latitude information at the current position is retained. Since the random walk that is the last term of Equations 1 and 2 is a probabilistic value even in the case of the same gyroscope, it may have different values. However, the probabilistic standard deviations thereof are identical to each other. If Equations 1 and 2 are combined with each other to obtain a bias, the following Equation 3 is obtained.

$$\Omega_1 + \Omega_2 = \Omega_N(\cos(H) + \cos(H + \alpha)) + 2B + \frac{\sigma(RW)}{\sqrt{2T}} \quad \text{[Equation 3]}$$

$$= 2\cos\left(\frac{\alpha}{2}\right)\Omega_N \cos\left(H + \frac{\alpha}{2}\right) + 2B + \frac{\sigma(RW)}{\sqrt{2T}}$$

In a random walk term that is the last term of Equation 3, the magnitude of an error is decreased by $\sqrt{2}$ times due to the processing of Equation 3 because the random walks in Equations 1 and 2 do not have a correlation. From Equation 3, an estimated bias value $\hat{B}_1$ may be obtained by the following Equation 4:

$$\hat{B}_1 = \frac{\Omega_1 + \Omega_2}{2} - \cos\left(\frac{\alpha}{2}\right)\Omega_N \cos\left(H + \frac{\alpha}{2}\right) \quad \text{[Equation 4]}$$

$$= B + \frac{\sigma(RW)}{\sqrt{2T}}$$

In Equation 4, if α=±180°, the processing of a second term on a right side in a first line is not necessary. If α=±180° is not satisfied, information about an azimuth angle is required. Consequently, in order to obtain the bias, α=±180° must be selected. Here, a bias estimation error is σ(RW)/$\sqrt{2T}$. Next, when a difference between Equations 1 and 2 is obtained in order to eliminate a gyroscope bias error, the following Equation 5 is obtained.

$$\Omega_1 - \Omega_2 = \Omega_N(\cos(H) - \cos(H + \alpha)) + \frac{\sigma(RW)}{\sqrt{2T}} \quad \text{[Equation 5]}$$

$$= 2\sin\left(\frac{\alpha}{2}\right)\Omega_N \sin\left(H + \frac{\alpha}{2}\right) + \frac{\sigma(RW)}{\sqrt{2T}}$$

Random walk in Equation 5 is decreased by $\sqrt{2}$ times regardless of the sum or difference between Equations 1 and 2. If sin(α/2)≠0, that is, if rotation is performed, and if $\Omega_N$, that is, latitude, is known, the approximate azimuth angle $\hat{H}_1$ may be obtained using the following Equation 6:

$$\hat{H}_1 = \sin^{-1}\left(\frac{\Omega_1 - \Omega_2}{2\sin\left(\frac{\alpha}{2}\right)\Omega_N}\right) - \frac{\alpha}{2} \quad \text{[Equation 6]}$$

$$= \sin^{-1}\left\{\sin\left(H + \frac{\alpha}{2}\right) + \frac{1}{\sin\frac{\alpha}{2}} \cdot \frac{1}{\Omega_N} \cdot \frac{\sigma(RW)}{\sqrt{2T}}\right\} - \frac{\alpha}{2}$$

Further, the azimuth angle estimation error $\delta\hat{H}_1$ of Equation 6 is represented by the following Equation 7:

$$\delta\hat{H}_1 = \frac{1}{\cos\left(H + \frac{\alpha}{2}\right)} \frac{1}{\sin\left(\frac{\alpha}{2}\right)} \frac{1}{\Omega_N} \frac{\sigma(RW)}{\sqrt{2T}} \quad \text{[Equation 7]}$$

As shown in Equation 7, it can be seen that, even aside from the gyroscope error, the estimation error is dependent on the amount of rotation α and the azimuth angle H. Consequently, in order to minimize an error in Equation 7, the condition of the following Equation 8 must be satisfied.

$$\cos\left(H + \frac{\alpha}{2}\right) = \sin\left(\frac{\alpha}{2}\right) = 1 \quad \text{[Equation 8]}$$

If, at α=±180°, H=∓90°, Equation 8 may be satisfied, but H is a value required to be obtained, and thus it cannot be randomly designated. As a result, Equation 7 has a minimum error when α=±180°.

The step S400 of calculating the first precise azimuth angle includes the step S410 of determining the availability of the second approximate azimuth angle, the step S420 of acquiring a third average, a third rotation step S430, the step S440 of acquiring a fourth average, the step S450 of calculating a first precise bias, and the step S460 of calculating a first precise azimuth angle.

The step S410 of determining the availability of the second approximate azimuth angle is the step of determining the availability of the second approximate azimuth angle calculated at the step S300 of calculating the second approximate azimuth angle. The azimuth angle obtained at Equation 6 must be present in the east (90°). The reason for this is that, by rotating the gyroscope measurement axis by an angle of β using auxiliary information at the first rotation step S320, the gyroscope measurement axis is already located in the east. When the gyroscope measurement axis is not present near the east, that is, when the obtained azimuth angle has a large difference from 90° (when falling out of a range from 45° to 135°), it is determined that the auxiliary information is an error and the second approximate azimuth angle is not available at the step S410 of determining the availability of the second approximate azimuth angle. In this case, the step S410 of determining the availability of the second approximate azimuth angle is performed only when it is determined at step S310 that the first approximate azimuth angle is available. If the gyroscope measurement axis is present near the east (when the azimuth angle falls within the range from 45° to 135°), it is determined that the auxiliary information is available and the second approximate azimuth angle is available. Therefore, the results of minimizing the error in Equation 7 using the auxiliary information are obtained. That is, the error is minimized by approximately satisfying Equation 8.

The step S420 of acquiring the third average is the step of, when the second approximate azimuth angle is determined to be available, acquiring a third average $\Omega_3$ of gyroscope measurement values of the digital sight for the hand-carried projectile-firing device for a preset second time period $T_2$. The third rotation step S430 is the step of, after the third average acquisition step S420, rotating the gyroscope measurement axis at a preset angle (α=180°).

The step S440 of acquiring the fourth average is the step of, after the third rotation step S430, acquiring a fourth average $\Omega_4$ of gyroscope measurement values of the digital sight for the hand-carried projectile-firing device for the preset second time period $T_2$. Further, the step S450 of calculating the first precise bias is the step of calculating a precise bias from the third average $\Omega_3$ and the fourth average $\Omega_4$. The step S460 of calculating the first precise azimuth angle is the step of calculating a precise azimuth angle $\hat{H}_2$ from the third average $\Omega_3$ and the fourth average $\Omega_4$.

By the gyroscope error, the performance of the digital sight according to the present invention is determined, and the random walk of the gyroscope error is in inverse proportion to the square root of time, and thus an average obtained for a long time period must be used to improve performance. As a result, measurement is performed for a short time period $T_1$ to perform an approximate determination, and thereafter measurement may be changed to the measurement of a precise azimuth angle for a relatively long time period $T_2$. In this case, in order to reduce the number of rotations, data measured during a time period longer than a time period during which data is acquired in a previous procedure is acquired at the last position of the previous procedure at step S420, and then the gyroscope measurement axis is rotated at step S430. Then, data is acquired again at step S440, and a first precise azimuth angle and a first precise bias are obtained at steps S450 and S460.

The third average $\Omega_3$ may be obtained by substituting $T_2$ into Equation 1. The fourth average $\Omega_4$ may be obtained by substituting $T_2$ into Equation 2. The first precise bias may be obtained by substituting $\Omega_3$, $\Omega_4$, and $T_2$ into Equations 3 and 4. The first precise azimuth angle may be obtained by substituting $\Omega_3$, $\Omega_4$, and $T_2$ into Equations 4 to 8.

The method of controlling the digital sight for the hand-carried projectile-firing device is characterized in that, if it is determined at step S370 that latitude information at the current position is not retained, the step S500 of calculating the second precise azimuth angle is performed. The step S500 of calculating the second precise azimuth angle includes the step S510 of acquiring a fifth average, a fifth rotation step S520, the step S530 of acquiring a sixth average, the step S540 of calculating a second precise bias, and the step S550 of calculating a second precise azimuth angle.

The step S510 of acquiring the fifth average is the step of acquiring a fifth average $\Omega_2'$ of gyroscope measurement values of the digital sight for the hand-carried projectile-firing device for the preset second time period $T_2$. The fifth rotation step S520 is the step of, after the fifth average acquisition step S510, rotating the gyroscope measurement axis at a preset angle α=180°. The step S530 of acquiring the sixth average is the step of, after the fifth rotation step S520, acquiring a sixth average $\Omega_3'$ of gyroscope measurement values of the digital sight for the hand-carried projectile-firing device for the preset second time period $T_2$. Further, the second precise bias calculation step S540 is the step of calculating a precise bias from the fifth average $\Omega_2'$ and the sixth average $\Omega_3'$, and the second precise azimuth angle calculation step S550 is the step of calculating a precise azimuth angle from the fifth average $\Omega_2'$ and the sixth average $\Omega_3'$. If the azimuth angle provided from the auxiliary information is not available, the azimuth angle obtained using Equation 6 has a problem in that an arc sine function is a many-valued function, as shown in FIG. 6, in addition to a problem in that the estimation error is dependent on the amount of rotation α and the azimuth angle H. Further, the case of α=±180° has a problem in that an arc cosine function is a many-valued function. Prior to solving the problems, the case (S370) where information about latitude is not present will be described. A precise value of latitude is not required at ordinary times, but it is a condition that cannot be excluded during a war situation in which the weapon system is operated. When the latitude cannot be known, $\Omega_N$ in Equation 6 cannot be obtained, and thus the azimuth angle cannot be calculated. In order to solve this problem, if the average of the gyroscope measurement values acquired at the position (α=)±180° of Equation 2 is $\Omega_2'$, and the average of the gyroscope measurement values acquired by additionally rotating the gyroscope measurement axis at an angle of 90° at step S520 ($\alpha$=270°) is $\Omega_3'$, an equation related to these values is given by the following Equation 9:

$$\Omega_2' = -\Omega_N \cos(H) + B + \frac{\sigma(RW)}{\sqrt{T}} (\alpha = 180°) \quad \text{[Equation 9]}$$

$$\Omega_3' = \Omega_N \sin(H) + B + \frac{\sigma(RW)}{\sqrt{T}} (\alpha = 270°)$$

Further, when the estimated bias value of Equation 4 is eliminated from Equation 9, the following Equation 10 is obtained.

$$\Omega_2'' = -\Omega_N \cos(H) + \frac{\sigma(RW)}{\sqrt{T}} \quad \text{[Equation 10]}$$

$$\Omega_3'' = \Omega_N \sin(H) + \frac{\sigma(RW)}{\sqrt{T}}$$

From the above Equation 10, the second precise azimuth angle (S550) may be obtained, as given by the following Equation 11:

$$\hat{H}_2 = \tan^{-1}\left(\frac{\Omega_3''}{-\Omega_2''}\right) \quad \text{[Equation 11]}$$

Further, the azimuth angle measurement error in Equation 11 is given by the following Equation 12:

$$\delta \hat{H}_2 = \frac{1}{\Omega_N} \frac{\sigma(RW)}{\sqrt{T}} \quad \text{[Equation 12]}$$

Consequently, when the latitude cannot be known, the average of gyroscope measurement values at that position is acquired (S510), the gyroscope measurement axis is rotated (S520), the average of gyroscope measurement values is again acquired (S530), and the previously obtained estimated bias value (S360) is corrected, and thereafter the azimuth angle may be obtained using Equation 11 (S550). Here, when the gyroscope measurement axis is rotated at an angle of 180° in Equation 7, and when it is rotated at an angle of 90° in Equation 12, if the measurement errors are written again, the following Equation 13 is given.

$$\delta \hat{H}_{180} = \frac{1}{\sin(H)} \frac{1}{\Omega_N} \frac{1}{\sqrt{2}} \frac{\sigma(RW)}{\sqrt{T}} \quad \text{[Equation 13]}$$

$$\delta \hat{H}_{90} = \frac{1}{\Omega_N} \frac{\sigma(RW)}{\sqrt{T}}$$

As can be seen in Equation 13, when the actual azimuth angle falls within the range from ±45° to ±135°, a precise value may be obtained at the rotation of 180°, and, in the remaining cases, a precise value may be obtained at the rotation of 90°. However, when rotation is performed at an angle of 90°, the estimation of a bias based on the rotation of 180° must be performed in advance to eliminate the bias. Therefore, two methods have mutual advantages and disadvantages between time and precision. The present invention has developed a digital sight that efficiently uses such mutual advantages and disadvantages.

Then, the case where the latitude is known, but it is determined at step S410 that the second approximate azimuth angle is not available will be described. A rotation determination step S470 is the step of, if it is determined at step S410 that the second approximate azimuth angle is not available, determining whether the second approximate azimuth angle falls within the range from 45° to 135° when the gyroscope measurement axis is rotated at an angle of 90° or −90°. A fourth rotation step S480 is the step of, if it is determined at step S470 that the second approximate azimuth angle falls within the range from 45° to 135° when the gyroscope measurement axis is rotated at an angle of 90° or −90°, rotating the gyroscope measurement axis at an angle of 90° or −90°. After the fourth rotation step S480, the step S420 of acquiring the third average is performed.

The second approximate azimuth angle 210 has a problem of being a many-valued function, and the rotation of the gyroscope measurement axis is required to solve this problem. A conceptual diagram of the rotation of the gyroscope measurement axis is illustrated in FIG. 7. First, the gyroscope measurement axis is moved to the range of 45° to 135° having no problem of a many-valued function in such a way that the gyroscope measurement axis is rotated at an angle of 90° when the absolute value of the second approximate azimuth angle is less than 45°, and is rotated at an angle of −90° when the absolute value of the second approximate azimuth angle is greater than 135° at step S480. Consequently, the gyroscope measurement axis is located in the east, thus solving the problem of the many-valued function. In this range, since a formula in the first line of Equation 13 is beneficial, data is acquired at step S420, and then the gyroscope measurement axis is rotated at step S430. Data is acquired again at step S440, and thereafter an azimuth angle and a bias are calculated at steps S450 and S460.

If it is determined at the rotation determination step S470 that the second approximate azimuth angle does not fall within the range from 45° to 135° when the gyroscope measurement axis is rotated at an angle of 90° or −90°, the step S500 of calculating the second precise azimuth angle is performed. That is, when the second approximate azimuth angle falls within the range from ±45° to ±135°, if the gyroscope measurement axis is rotated at an angle of 90° required to solve the many-valued function, the gyroscope measurement axis is present in a range in which performance is deteriorated in the formula in the first line of Equation 13, and thus a method identical to that of step S500 required when information about latitude is not present without rotation is taken.

Further, one or more of the second approximate azimuth angle, the first precise azimuth angle, and the second precise azimuth angle that are finally obtained in the above procedure may be used as auxiliary information at the step S200 of acquiring the first approximate azimuth angle.

The above-described embodiments are merely preferred embodiments allowing those skilled in the art to which the present invention pertains (hereinafter referred to as "those skilled in the art") to easily practice the present invention, and the present invention is not limited by the above embodiments and the attached drawings, and thus the scope of the present invention is not limited. Therefore, those skilled in the art will appreciate that the various substitutions, modifications, and changes are possible without departing from the technical spirit of the present invention, and it is apparent that parts which may be easily changed by those skilled in the art will also be included in the spirit and scope of the present invention.

DESCRIPTION OF THE REFERENCE
NUMERALS IN THE DRAWINGS

100: digital sight for hand-carried projectile-firing device
200: inertial sensor package
210: gyroscope
220: accelerometer module
221: horizontal accelerometer
222: vertical accelerometer
223: geomagnetic sensor
230: gyroscope signal processing board
240: accelerometer module signal processing board
250: wired/wireless communication board
260: antenna
300: manual rotation device
310: azimuth angle adjustment device
320: altitude adjustment device
330: digital sight bracket
340: mounting bracket

The invention claimed is:

1. A method of controlling a digital sight for a hand-carried projectile-firing device, comprising:
an aligning step (S100) of, by using a vertical accelerometer and a horizontal accelerometer, performing horizontal alignment and then aligning a gyroscope measurement axis with a firing direction;
a step (S200) of, after the aligning step (S100), acquiring a first approximate azimuth angle from auxiliary information;
a step (S300) of, after the step (S200) of acquiring the first approximate azimuth angle, calculating a second approximate azimuth angle; and
a step (S400) of, after the step (S300) of calculating the second approximate azimuth angle, calculating a first precise azimuth angle,
wherein the step (S300) of calculating the second approximate azimuth angle comprises:
a determining step (S310) of determining availability of the first approximate azimuth angle acquired at the step (S200) of acquiring the first approximate azimuth angle;
a first rotation step (S320) of, if it is determined at the determining step (S310) that the first approximate azimuth angle is available, rotating the gyroscope measurement axis so that the gyroscope measurement axis is coincident with a due east direction with respect to the first approximate azimuth angle;
a first average acquisition step (S330) of, after the first rotation step (S320), acquiring a first average ($\Omega_1$) of gyroscope measurement values of the digital sight for the hand-carried projectile-firing device for a preset first time period ($T_1$);
a second rotation step (S340) of, after the first average acquisition step (S330), rotating the gyroscope measurement axis at an angle of 180°;
a second average acquisition step (S350) of, after the second rotation step (S340), acquiring a second average ($\Omega_2$) of gyroscope measurement values of the digital sight for the hand-carried projectile-firing device for the preset first time period ($T_1$);
an approximate bias calculation step (S360) of calculating an approximate bias from the first average ($\Omega_1$) and the second average ($\Omega_2$);
a step (S370) of, after the approximate bias calculation step (S360), determining whether latitude information at a current position is retained; and
a step (S380) of, if it is determined at the step (S370) that the latitude information at the current position is retained, calculating the second approximate azimuth angle from the first average ($\Omega_1$) and the second average ($\Omega_2$).

2. The method of claim 1, wherein the second approximate azimuth angle is used as the auxiliary information at the step (S200) of acquiring the first approximate azimuth angle.

3. The method of claim 1, wherein the step (S400) of calculating the first precise azimuth angle comprises:
a step (S410) of determining availability of the second approximate azimuth angle;
a third average acquisition step (S420) of, if it is determined that the second approximate azimuth angle is available, acquiring a third average ($\Omega_3$) of gyroscope measurement values of the digital sight for the hand-carried projectile-firing device for a preset second time period ($T_2$);
a third rotation step (S430) of, after the third average acquisition step (S420), rotating the gyroscope measurement axis at an angle of 180°;
a fourth average acquisition step (S440) of, after the third rotation step (S430), acquiring a fourth average ($\Omega_4$) of gyroscope measurement values of the digital sight for the hand-carried projectile-firing device for the preset second time period ($T_2$);
a step (S450) of calculating a first precise bias from the third average ($\Omega_3$) and the fourth average ($\Omega_4$); and
a step (S460) of calculating the first precise azimuth angle from the third average ($\Omega_3$) and the fourth average ($\Omega_4$).

4. The method of claim 3, wherein the first precise azimuth angle is used as the auxiliary information at the step (S200) of acquiring the first approximate azimuth angle.

5. The method of claim 3, further comprising:
if it is determined that the second approximate azimuth angle is not available, a step (S470) of determining whether the second approximate azimuth angle falls within a range from 45° to 135° when the gyroscope measurement axis is rotated at an angle of 90° or −90°; and
a fourth rotation step (S480) of rotating the gyroscope measurement axis at an angle of 90° or −90° if it is determined at the step S470 that the second approximate azimuth angle falls within the range from 45° to 135° when the gyroscope measurement axis is rotated at the angle of 90° or −90°,
wherein, after the fourth rotation step (S480), the third average acquisition step (S420) of acquiring the third average is performed.

6. The method of claim 5, further comprising:
a step (S500) of calculating a second precise azimuth angle if it is determined at the step (S470) that the second approximate azimuth angle does not fall within the range from 45° to 135° when the gyroscope measurement axis is rotated at the angle of 90° or −90°.

7. The method of claim 6, wherein the second precise azimuth angle is used as the auxiliary information at the step (S200) of acquiring the first approximate azimuth angle.

8. The method of claim 6, wherein the step (S500) of calculating the second precise azimuth angle comprises:
a fifth average acquisition step (S510) of acquiring a fifth average ($\Omega_2'$) of gyroscope measurement values of the digital sight for the hand-carried projectile-firing device for the preset second time period ($T_2$);

a fifth rotation step (S520) of, after the fifth average acquisition step (S510), rotating the gyroscope measurement axis at an angle of 90°;

a sixth average acquisition step (S530) of, after the fifth rotation step (S520), acquiring a sixth average ($\Omega_3'$) of gyroscope measurement values of the digital sight for the hand-carried projectile-firing device for the preset second time period ($T_2$);

a step (S540) of calculating a second precise bias from the fifth average($\Omega_2'$) and the sixth average ($\Omega_3'$); and a step (S550) of calculating the second precise azimuth angle from the fifth average ($\Omega_2'$) and the sixth average ($\Omega_3'$).

9. The method of claim 8, wherein the step (S500) of calculating the second precise azimuth angle is performed even if it is determined at the step (S370) that the latitude information at the current location is not retained.

10. A method of controlling a digital sight for a hand-carried projectile-firing device, comprising:

an aligning step (S100) of, by using a vertical accelerometer and a horizontal accelerometer, performing horizontal alignment and then aligning a gyroscope measurement axis with a firing direction;

a step (S200) of, after the aligning step (S100), acquiring a first approximate azimuth angle from auxiliary information;

a step (S300) of, after the step (S200) of acquiring the first approximate azimuth angle, calculating a second approximate azimuth angle; and a step (S400) of, after the step (S300) of calculating the second approximate azimuth angle, calculating a first precise azimuth angle, wherein the step (S300) of calculating the second approximate azimuth angle comprises;

a determining step (S310) of determining availability of the first approximate azimuth angle acquired at the step (S200) of acquiring the first approximate azimuth angle;

a first average acquisition step (S330) of acquiring a first average ($\Omega_1$) of gyroscope measurement values of the digital sight for the hand-carried projectile-firing device for a preset first time period ($T_1$);

a second average acquisition step (S350) of acquiring a second average ($\Omega_2$) of gyroscope measurement values of the digital sight for the hand-carried projectile-firing device for the preset first time period ($T_1$), wherein the step (S400) of calculating the first precise azimuth angle comprises:

a step (S410) of determining availability of the second approximate azimuth angle;

a third average acquisition step (S420) of, if it is determined that the second approximate azimuth angle is available, acquiring a third average ($\Omega_3$) of gyroscope measurement values of the digital sight for the hand-carried projectile-firing device for a preset second time period ($T_2$);

a third rotation step (S430) of, after the third average acquisition step (S420), rotating the gyroscope measurement axis at an angle of 180°;

a fourth average acquisition step (S440) of, after the third rotation step (S430), acquiring a fourth average ($\Omega_4$) of gyroscope measurement values of the digital sight for the hand-carried projectile-firing device for the preset second time period ($T_2$);

a step (S450) of calculating a first precise bias from the third average ($\Omega_3$) and the fourth average ($\Omega_4$); and a step (S460) of calculating the first precise azimuth angle from the third average ($\Omega_3$) and the fourth average ($\Omega_4$).

11. The method of claim 10, further comprising:

if it is determined that the second approximate azimuth angle is not available, a step (S470) of determining whether the second approximate azimuth angle falls within a range from 45° to 135° when the gyroscope measurement axis is rotated at an angle of 90° or −90°; and a fourth rotation step (S480) of rotating the gyroscope measurement axis at an angle of 90° or −90° if it is determined at the step S470 that the second approximate azimuth angle falls within the range from 45° to 135° when the gyroscope measurement axis is rotated at the angle of 90° or −90°, wherein, after the fourth rotation step (S480), the third average acquisition step (S420) of acquiring the third average is performed.

12. The method of claim 10, wherein the first precise azimuth angle is used as the auxiliary information at the step (S200) of acquiring the first approximate azimuth angle.

13. The method of claim 11, further comprising:

a step (S500) of calculating a second precise azimuth angle if it is determined at the step (S470) that the second approximate azimuth angle does not fall within the range from 45° to 135° when the gyroscope measurement axis is rotated at the angle of 90° or −90°.

14. The method of claim 13, wherein the second precise azimuth angle is used as the auxiliary information at the step (S200) of acquiring the first approximate azimuth angle.

15. The method of claim 13, wherein the step (S500) of calculating the second precise azimuth angle comprises:

a fifth average acquisition step (S510) of acquiring a fifth average ($\Omega_2'$) of gyroscope measurement values of the digital sight for the hand-carried projectile-firing device for the preset second time period ($T_2$);

a fifth rotation step (S520) of, after the fifth average acquisition step (S510), rotating the gyroscope measurement axis at an angle of 90°;

a sixth average acquisition step (S530) of, after the fifth rotation step (S520), acquiring a sixth average ($\Omega_3'$) of gyroscope measurement values of the digital sight for the hand-carried projectile-firing device for the preset second time period ($T_2$);

a step (S540) of calculating a second precise bias from the fifth average ($\Omega_2'$) and the sixth average ($\Omega_3'$); and a step (S550) of calculating the second precise azimuth angle from the fifth average($\Omega_2'$) and the sixth average ($\Omega_3'$).

16. The method of claim 15, wherein the step (S500) of calculating the second precise azimuth angle is performed even if it is determined at the step (S370) that the latitude information at the current location is not retained.

* * * * *